United States Patent
Habib et al.

(10) Patent No.: US 12,216,772 B2
(45) Date of Patent: Feb. 4, 2025

(54) METHOD AND APPARATUS FOR POWER EFFICIENT LOSSLESS COMPRESSION AND DECOMPRESSION

(71) Applicant: Microsoft Technology Licensing, LLC, Redmond, WA (US)

(72) Inventors: Farooq Habib, Sunnyvale, CA (US); Chandra Mouli Dhandapani, Santa Clara, CA (US); Haoting Luo, San Jose, CA (US); Anand Krishnamoorthy Iyer, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/067,163

(22) Filed: Dec. 16, 2022

(65) Prior Publication Data

US 2024/0202347 A1 Jun. 20, 2024

(51) Int. Cl.
*G06F 21/60* (2013.01)
*G06F 17/14* (2006.01)

(52) U.S. Cl.
CPC .......... *G06F 21/602* (2013.01); *G06F 17/145* (2013.01)

(58) Field of Classification Search
CPC .. G06F 21/602; G06F 17/145; H03M 7/6047; H03M 7/6029; H03M 7/4006; H04L 9/085
See application file for complete search history.

(56) References Cited

U.S. PATENT DOCUMENTS

| | | | | |
|---|---|---|---|---|
| 8,726,281 | B2* | 5/2014 | Raghavan | G06F 8/4432 718/101 |
| 2003/0025805 | A1* | 2/2003 | Yamagishi | G06T 1/005 348/222.1 |

(Continued)

OTHER PUBLICATIONS

"Asymmetric numeral systems", Rederived From: https://en.wikipedia.org/wiki/Asymmetric_numeral_systems, Dec. 13, 2022, 10 Pages.

(Continued)

*Primary Examiner* — Michael Won
(74) *Attorney, Agent, or Firm* — Alleman Hall & Tuttle LLP (57) ABSTRACT

Mechanisms are disclosed for performing efficient lossless encryption and decryption to reduce power consumption and improve the efficiency of processing streams of digital data. An input data stream associated with a stream of input data is received. A discrete wavelet transform is applied to a first serial input data value in the input data stream. Distributed components of the first serial input data value are distributed by computing a cumulative probability that the first serial input data value is less than or equal to a power-of-two range value associated with a power-of-two probability distribution function. An entropy encoded encryption value is computed based on a range variant asymmetrical numeral system based on the power-of-two probability distribution function. The entropy encoded encryption value is unloaded based on one or more computed next states. Compressed serial output data streams are compressed based on the unloaded entropy encoded encryption value.

20 Claims, 5 Drawing Sheets

(56) References Cited

U.S. PATENT DOCUMENTS

| | | | |
|---|---|---|---|
| 2003/0156050 A1* | 8/2003 | Koyama | ................ G06T 9/005 |
| | | | 341/107 |
| 2004/0109565 A1 | 6/2004 | Uehara | |
| 2023/0291417 A1* | 9/2023 | Arnavut | .............. G06F 21/6209 |

OTHER PUBLICATIONS

Duda, et al., "Lightweight compression with encryption based on Asymmetric Numeral Systems", Cornell University 2 Library, 201 Olin Library Cornell University Ithaca, NY, Dec. 14, 2016, 10 Pages.

International Search Report and Written Opinion received for PCT Application No. PCT/US2023/035680, Jan. 30, 2024, 16 pages.

Li Shuo-Hui, "Learnable Non-linear Wavelet Transformation via Normalizing Flow", Retrieved from: https://arxiv.org/pdf/2101.11306.pdf., Jan. 27, 2022, 20 Pages.

Vishnevskiy, et al., "The Use of Asymmetric Numeral SystemsEntropy Encoding in Video Compression", Distributed Computer and Communication Networks, Revised Selected Papers: 22nd International Conference, 2019, pp. 125-139.

\* cited by examiner

METHOD AND APPARATUS FOR POWER EFFICIENT LOSSLESS COMPRESSION AND DECOMPRESSION

BACKGROUND

The present disclosure relates generally to digital circuits and systems, and in particular to a method and apparatus for efficient lossless compression and decompression of artificial intelligence workloads. Many modern digital systems and applications are required to process large volumes of digital values. For example, artificial intelligence applications may be required to store (e.g., in main memory) and process (e.g., perform mathematical operations) huge arrays of digital values representing training data and/or large trained machine learning models. In many cases such large volumes of data may contain repeated patterns that render the data compressible by way of various lossless compression techniques. However, those techniques that require computationally intensive operations, such as multiplication require significant resources in terms of power consumption and an associated cost of data center operations.

Embodiments described herein advantageously perform efficient lossless encryption and decryption to reduce power consumption and improve the efficiency of processing digital values.

DETAILED DESCRIPTION

Described herein are techniques for providing efficient lossless compression and/or decompression in connection with artificial intelligence workloads. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

In some embodiments, features and advantages of the present disclosure include circuit techniques for performing efficient lossless encryption and decryption to reduce power consumption and improve the efficiency of processing streams of digital data. Embodiments of the present disclosure proposes a solution which uses the properties of power of two probability distribution functions to avoid costly and power intensive mathematical operations. Certain embodiments disclosed herein result in a significant power consumption savings which enables more efficient and less resource intensive processing of large volumes of data, for example in the context of moving large amounts of compressible data. Transmitting and/or storing data that is compressed with compression techniques consistent with the present teachings consumes less power than transmitting and/or storing data without compression even after taking into account the power requited to carry out the data compression. In other words, power consumption associated with compressed vector transmission plus power consumption associated with compression algorithms consistent with the present teachings is less than the power consumption associated with non-compressed vector transmission of the same data.

Figure 1:
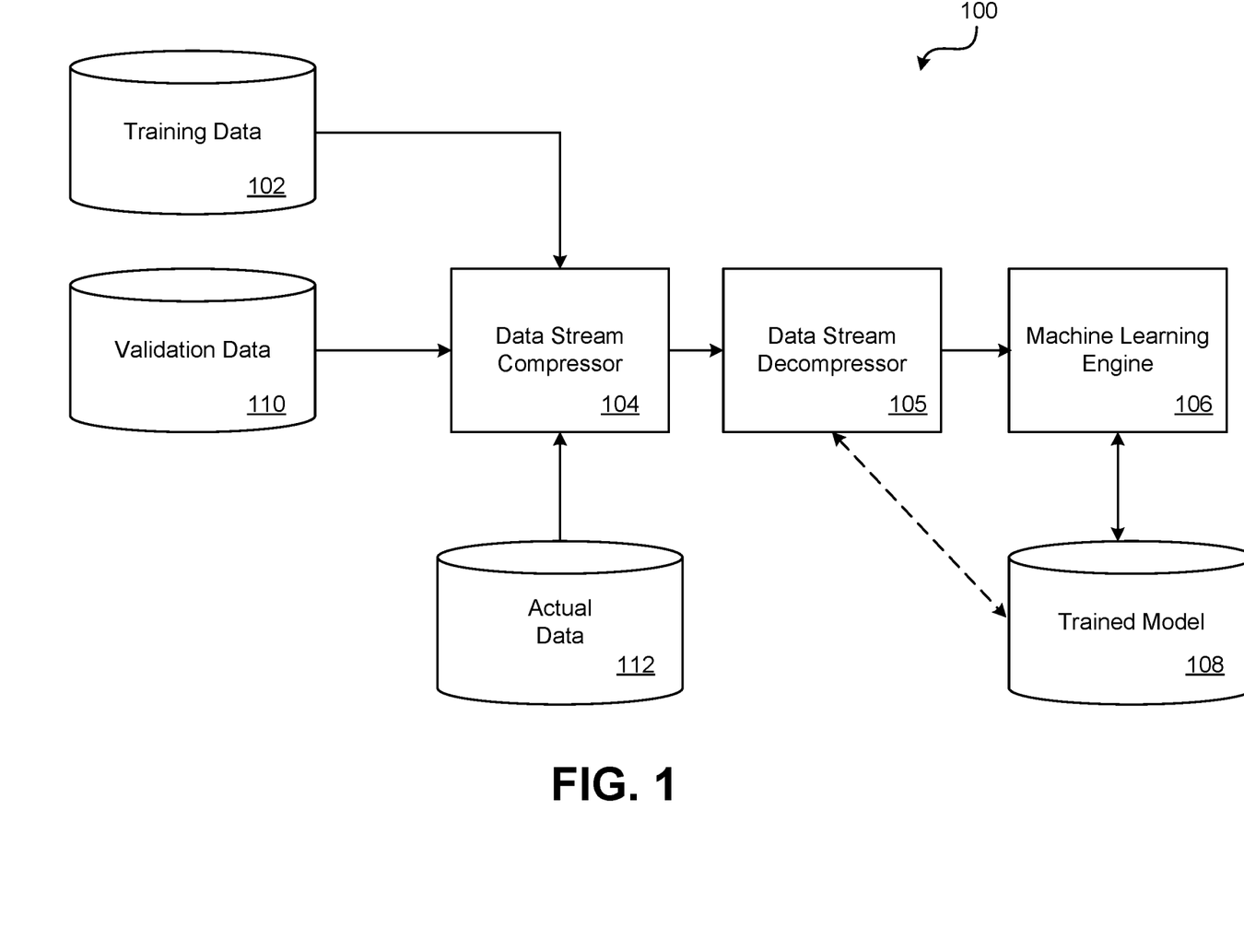
FIG. 1 illustrates a system diagram for employing compression and decompression for training and using a machine learning model according to an embodiment.

FIG. 1 illustrates a system diagram 100 for employing compression and decompression for training and using a machine learning model according to an embodiment. Information such for training a machine learning model such as training data such as training data 102 may include real-world data such as text of a corpus of technical articles or a library. Training data 102 may also include manually or automatically perturbed versions of such real-world data. Such data may be used to ultimately train a machine learning model that may be employed by a machine learning platform, which may employ an engine such as machine learning engine 106. This training of a machine learning model results in trained model 108, which model may be persisted in a storage medium proximate to machine learning engine 106. In practice a volume of data necessary to properly train a particular machine learning model may be voluminous, potentially in the range of terabytes. Transferring voluminous quantities of data takes time, energy, and bandwidth and is therefore costly. Moreover, training data 102 may be subject to significant lossless data compression. To the extent that that training data 102 comprises natural language text, such content may be subject to high-ratio lossless data compression. Other types of data that may be a source of training data 102 may also be subject to high-ratio lossless data compression.

In order to use training data 102 to train a machine learning model, the data must make its way along a pathway from a source of training data 102 to hardware hosting machine learning engine 106. This pathway may include stretches over a global Internet, within a datacenter, or merely within a backplane of a particular data center. Regardless of the pathway, reduction of transmitted data along the pathway means that fewer bytes of data must be transmitted, decreasing an amount of consumed time, bandwidth, energy, and cost associated (collectively resources) with transmitting the data. Accordingly, transmitting a data stream via data stream compressor 104 along a pathway to data stream decompressor 105 and finally to a destination such as machine learning engine 106 may save resources, especially in the case of high data volumes.

Once trained a machine learning model may be validated with other native or perturbed real-world data to evaluate how accurate a machine learning model is, once trained. To this end, data sources such as validation data 110 may be presented to a machine learning platform such as machine learning engine 106 in order to evaluate a level of accuracy corresponding to the trained machine learning model. While potentially not as voluminous as training data 102, validation data 110 may still be large, and energy savings may be realized by compressing validation data 110 as well. Moreover, a trained machine learning model such as trained model 108 may be persisted externally to machine learning engine 106, and rather than training a model from scratch, it may be desirable to transmit a previously trained machine learning model. Such a transmission may also benefit from use of data stream compressor 104 and data stream decompressor 105.

Given the availability of machine learning engine 106 and associated trained model 108, new real-world data may be provided to machine learning engine 106 in order to make an inference regarding the new data. In some cases, this new data may be provided directly to machine learning engine 106 to generate an inference. However, more frequently the new data may benefit from lossless transition. In such a scenario, actual data 112 may be compressed in connection with data stream compressor 104 transmitted to data stream decompressor 105 and finally to machine learning engine 106 in order to generate an inference regarding components of actual data 112. Such inferences may involve classifying elements of actual data 112 according to a taxonomy, for example.

Figure 2:
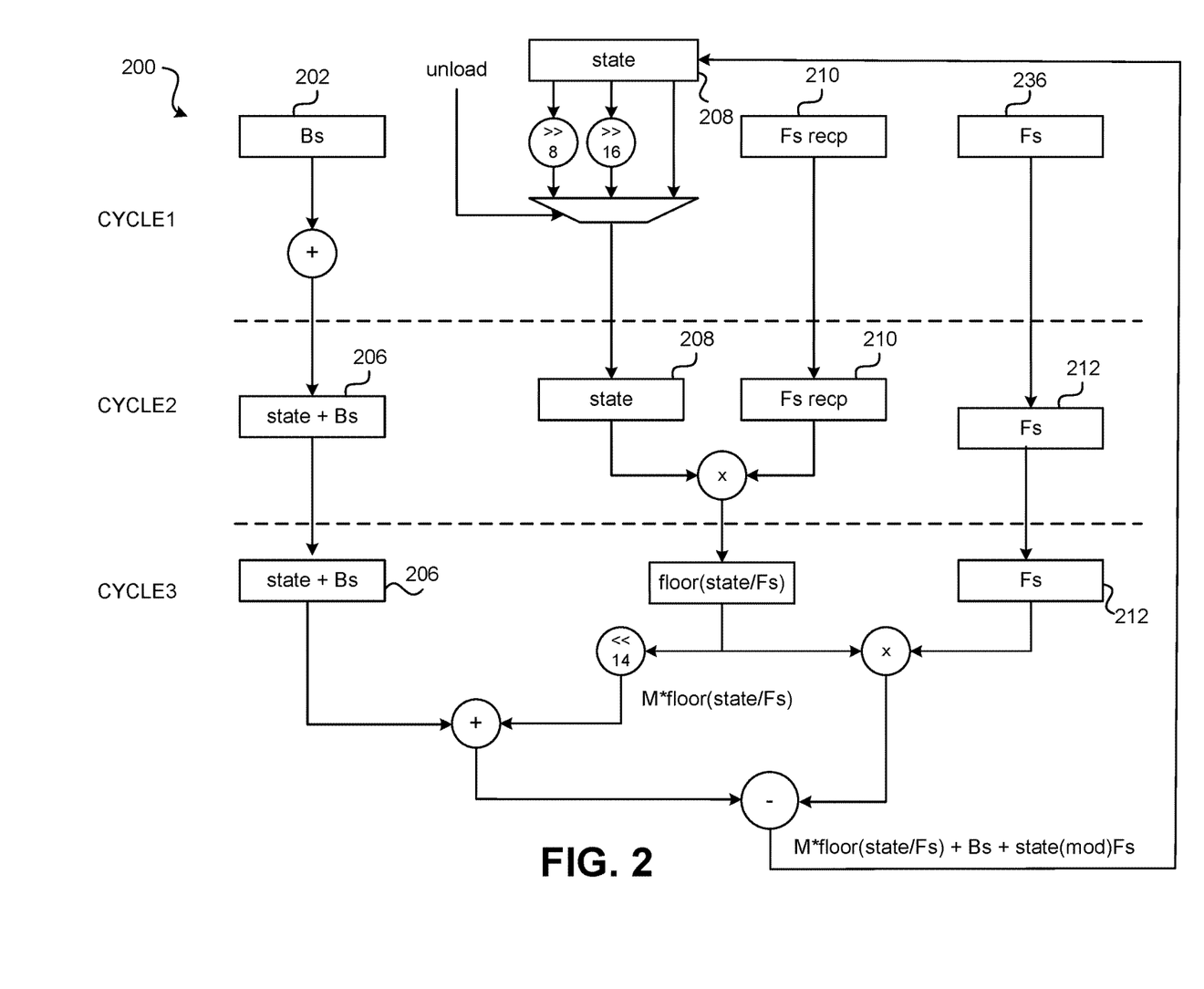
FIG. 2 illustrates a logical architecture for efficient lossless compression and decompression according to an embodiment.

FIG. 2 illustrates a logical architecture 200 for efficient lossless compression and decompression according to an embodiment. Each distribution has several parameters. First, there is a probability distribution function, denominated "Fs," which is shown in box 212 at cycle 1. Next there is a cumulative distribution function, denominated "Bs," corresponding to box 202 in cycle 1 as well. A reciprocal of the probability distribution function, denominated "Fs recp" corresponds to box 210 at cycle 1. As used herein distribution refers to a "best fit PDF/CDF" (probability density function/cumulative distribution function) that uncompressed data is mapped to, for compression and/or decompression. Each distribution corresponds to a look-up table corresponding to the corresponding probability distribution function. In some embodiments, for each of the above parameters, each look up table entry has nine elements, which are decoded based on a set of ranges shown below in Table 1.

TABLE 1

$$F_s = \begin{cases} PDF_0, data = 0 \\ PDF_1, data = 1 \\ PDF_2, 2 \leq data \leq 3 \\ PDF_3, 4 \leq data \leq 7 \\ PDF_4, 8 \leq data \leq 15 \\ PDF_5, 16 \leq data \leq 31 \\ PDF_6, 32 \leq data \leq 63 \\ PDF_7, 64 \leq data \leq 127 \\ PDF_8, 128 \leq data \leq 255 \end{cases}$$

In some embodiments, an implementation of the lookup table may be a multi-bit multiplexor selecting between various static distribution values. The distribution select is an input to the compression system, programmed by software. In some embodiments, for each CDF, each lookup table entry has 256 elements corresponding to all data combinations. Where probability distribution functions are based on powers of two, reciprocal probability distribution function lookup tables are not needed. An Xmax value reduces to 512<<Fs. An inexpensive shifter-based implementation may be adopted for the cumulative distribution function instead of a 256-entry lookup table and can be computed as follows.

TABLE 2

CDF = 0, when data = 0
CDF = K[0] + Fs[0], when data = 1
CDF = K[1] + Fs[1], when data = 2

TABLE 2-continued

CDF = K[2] + Fs[2]*(data − 2), when 3 <= data <= 4
CDF = K[3] + Fs[3]*(data − 4), when 5 <= data <= 8
CDF = K[4] + Fs[4]*(data − 8), when 9 <= data <= 16
CDF = K[5] + Fs[5]*(data − 16), when 17 <= data <= 32
CDF = K[6] + Fs[6]*(data − 32), when 33 <= data <= 64
CDF = K[7] + Fs[7]*(data − 64), when 65 <= data <= 128
CDF = K[8] + Fs[8]*(data − 128), when data >= 129

Given the lookup table of Table 2 above, the following numerical example is illustrative. Assuming the uncompressed data is 8-bits. PDF(Fs), and CDF(Bs) are calculated as shown above in connection with Table 2. K[0] . . . K[8] are constants that are stored in a look-up table. PDF0, . . . PDF8 correspond to Fs[0], . . . Fs[8] and are constants as well. As a numerical example, take input data=72. Fs={14'd5600/*Fs[0]*/, 14'd5600, 14'd1024, 14'd512, 14'd64, 14'd8, 14'd2, 14'd2, 14'd2/*Fs[8]*/}; K={14'd5600/ *K[0]*/, 14'd11200, 14'd11200, 14'd13248, 14'd15296, 14'd15808, 14'd15936, 14'd16000, 14'd16128/*K[8]*/}; CDF (Bs)=K[7]+Fs[7]*(data−64)=>16000+2*(8)=>16016.

Over the course of three cycles, operation of logical architecture 200 is performed as follows. A next state computation is pipelined and happens over three cycles, with the next state for a rANS logic being given by a first equation, based at least in part on state 208, state+Bs 206.

$$next\_state = M * floor(state/Fs) + Bs + state \ (mod) Fs$$

as shown in FIG. 2.

Floor(state/Fs) is a division operation, which is realized by multiplication with reciprocals (Fs recp 210). Accordingly, in a second equation:

$$floor(state/Fs) = state * Fsrecp \gg recp\_fs\_shift - q\_nxt,$$

where $M = 2^{14}$.

This is a simple left shift operation. In some embodiments, Fs recp and recp_fs_shift from the second equation are 24 and 4 bit values respectively are provided in connection with architecture consistent with the present teachings for all values of Fs. Moreover, in a third equation:

$$state \ (mod) Fs = state - q\_nxt * Fs.$$

Substituting the second and third equations into the first equation yields a fourth equation, namely:

$$next\_state = (q\_nxt << 14) + (Bs + state) - (q\_nxt * Fs)$$

The sequencing of operations per cycle is carried out as follows. The first cycle yields state+Bs. The second cycle produces (state*Fs recp)>>recp_fs_shift=q_next computation. The third cycle produces (q_nxt*Fs) and summing results from previous cycles. When PDF values are powers of two, state/Fs=state>>log 2(Fs) and state(mod) Fs=state>>log 2(Fs)−1. Accordingly, having power of 2 PDFs eliminates the need for multipliers and combinatorial power is significantly reduced in comparison to a circuit that implements integer multiplication and/or division. Moreover when using power of two PFS, reciprocal values are not needed in the circuit implementation.

Figure 3:
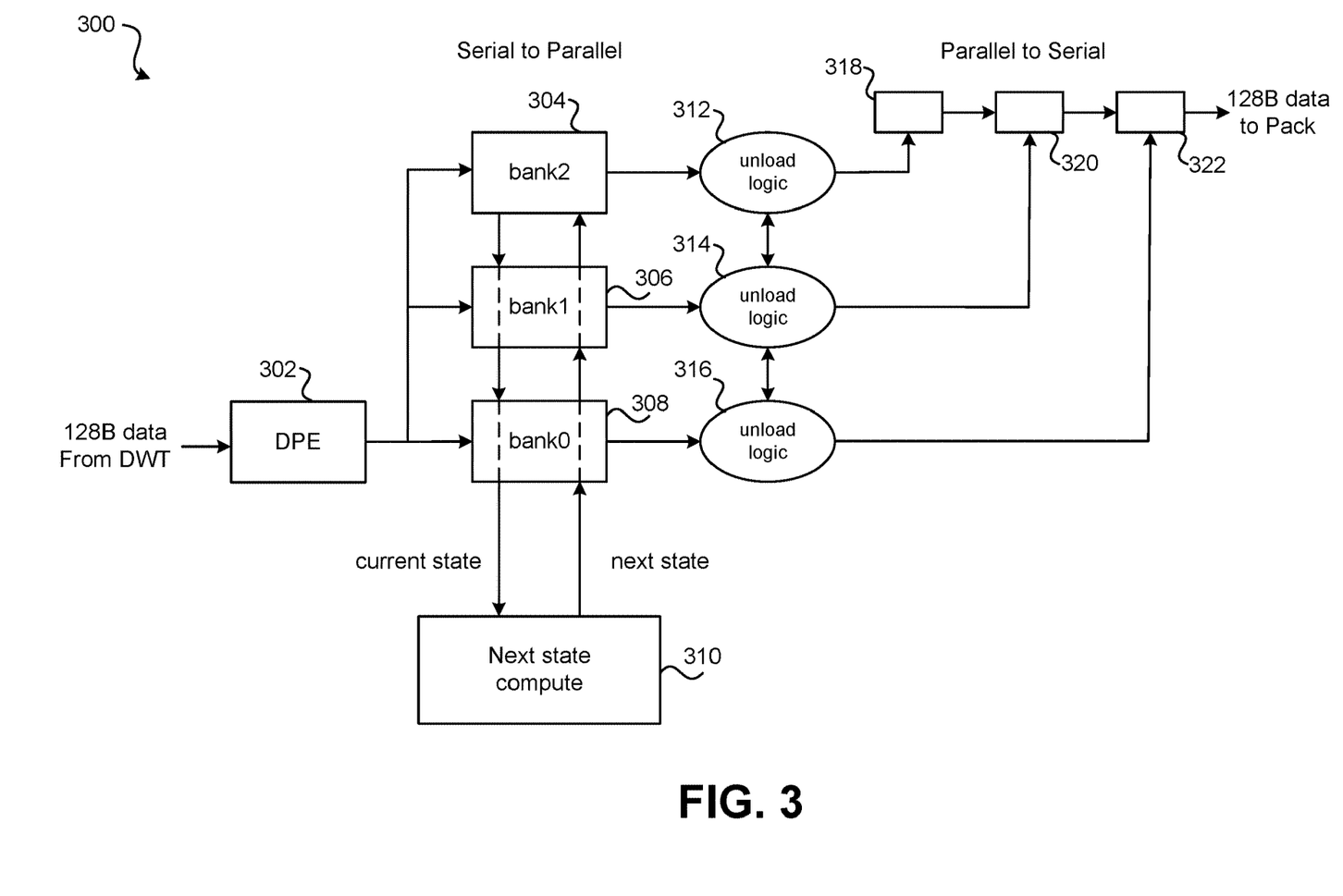
FIG. 3 illustrates another logical architecture for efficient lossless compression and decompression according to an embodiment.

FIG. 3 illustrates another logical architecture diagram 300 for efficient lossless compression according to an embodiment. Diagram 300 represents a high-level block diagram of range asymmetric numeral system (rANS) encoding engine. rANS is a variant of asymmetric numeral system (ANS) encoding that employs a finite state machine to provide efficient data compression. In some embodiments, at an interface level an input data path comprises 128-byte wide data streams that are preprocessed in connection with a discrete wavelet transform (DWT) that separate details within an input data stream to facilitate compression. In some embodiments the DWT is a Haar transform, which provides a computationally efficient approach for analyzing the local aspects of the input data stream. It is understood that that other preprocessing approaches may be employed or that any preprocessing may be omitted without departing from the scope of the present teachings.

In some embodiments, 128 rANS engineer are employed, with each engine processing one byte of data. In some such embodiments, the rANS engines are organized into banks with each bank containing 128 rANS engines. Such banks may be arranged according to data cycles with bank 308, denominated "bank0," bank 306, denominated "bank1," and, bank 304 denominated "bank 1," processing data from a first, second, and third cycle respectively. In some embodiments, each byte coming into a rANS engine is mapped to a set of distribution parameters which are data dependent. Such a distribution operation may be performed by distribution per engine (DPE) 302, of which there may be 128 in certain embodiments. A next state computation map be performed in connection with next state compute element 301, which associated computation may begin as soon as data and corresponding distribution parameters are received in a particular bank. Corresponding next state computation logic may comprise a three-stage pipeline, which logic may be shared between banks so that rANS operations may be time interleaved, starting with bank 308 and proceeding to bank 306 and bank 304 respectively. In connection with unload logic elements 312, 314, and 316, unload logic may require that all banks be loaded before unloads may be determined. Parallel to serial conversion may be carried out in connection with accumulators 318, 320, and 322 such that bits unloaded from the unload logic may be packed into an output data stream. The output data path may also be 128 bytes wide with each byte having a valid qualifier, which may be used to sample a data path or a portion of the data path, e.g., per byte with control logic so that only data at a current timing or position is moved out of the data compression circuit.

Figure 4:
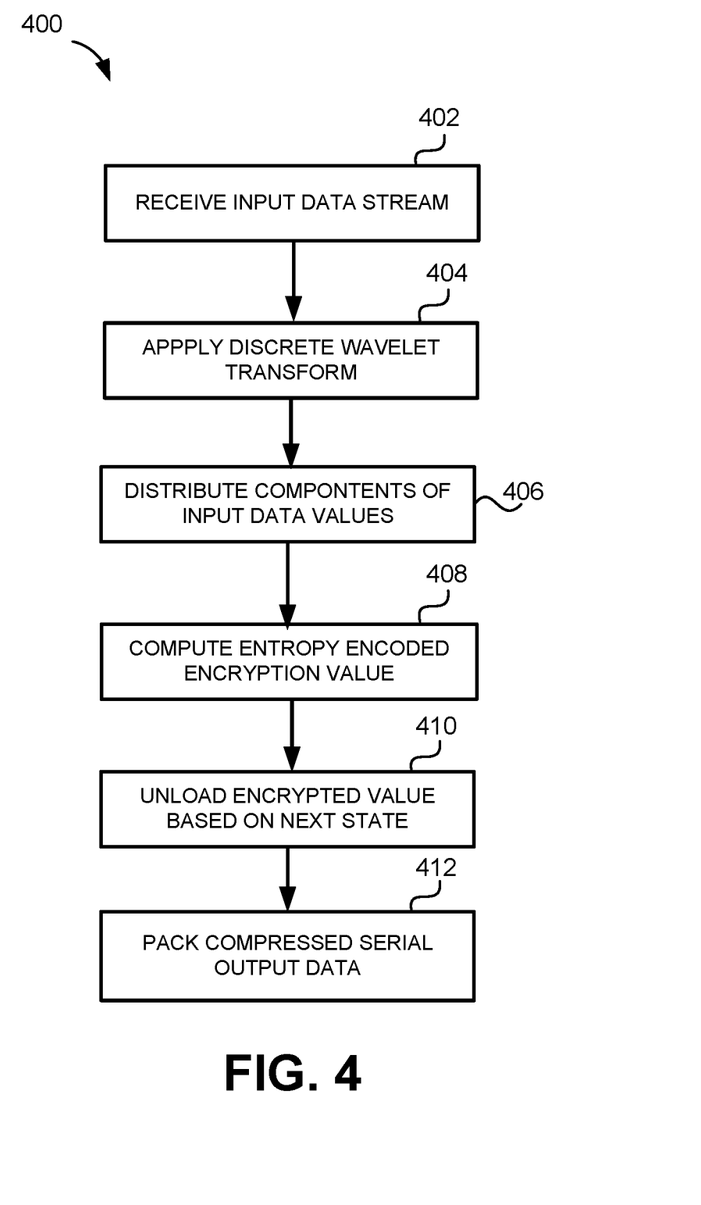
FIG. 4 illustrates a method for efficient lossless compression and decompression according to an embodiment.

FIG. 4 illustrates a method 400 for efficient lossless compression according to an embodiment. At step 402, an input data stream is received. The input data stream may be associated with a stream of input data having an input data width. In some embodiments the input data width is 128 bytes, however it is understood that the input data width may be wider or narrower. The input data stream may be training data for use in connection with training a machine learning model. At step 404, a discrete wavelet transform is applied to a first serial input data value in the input data stream. At step 406, one or more distributed components of the first serial input data value are distributed by computing a cumulative probability that the first serial input data value is less than or equal to a power-of-two range value associated with a power-of-two probability distribution function. Next, at step 406, an entropy encoded encryption value is computed based on a range variant asymmetrical numeral system based on the power-of-two probability distribution function.

Next, at step 410, the entropy encoded encryption value is unloaded based on one or more computed next states. At step 412, one or more compressed serial output data streams is packed based on the unloaded entropy encoded encryption value. In some embodiments, the discrete wavelet transform is a Haar transform. In some such embodiments, the cumulative probability is computed according to a range of values corresponding to the power-of-two probability distribution function. In some embodiments, the one or more computed next states is computed based on a current state and the entropy encoded encryption value corresponding to an entropy encoded encryption value of a parallel bank in a set of parallel banks having a number of banks. In some embodiments, unload logic is provided to serialize output from the set of parallel banks.

Figure 5:
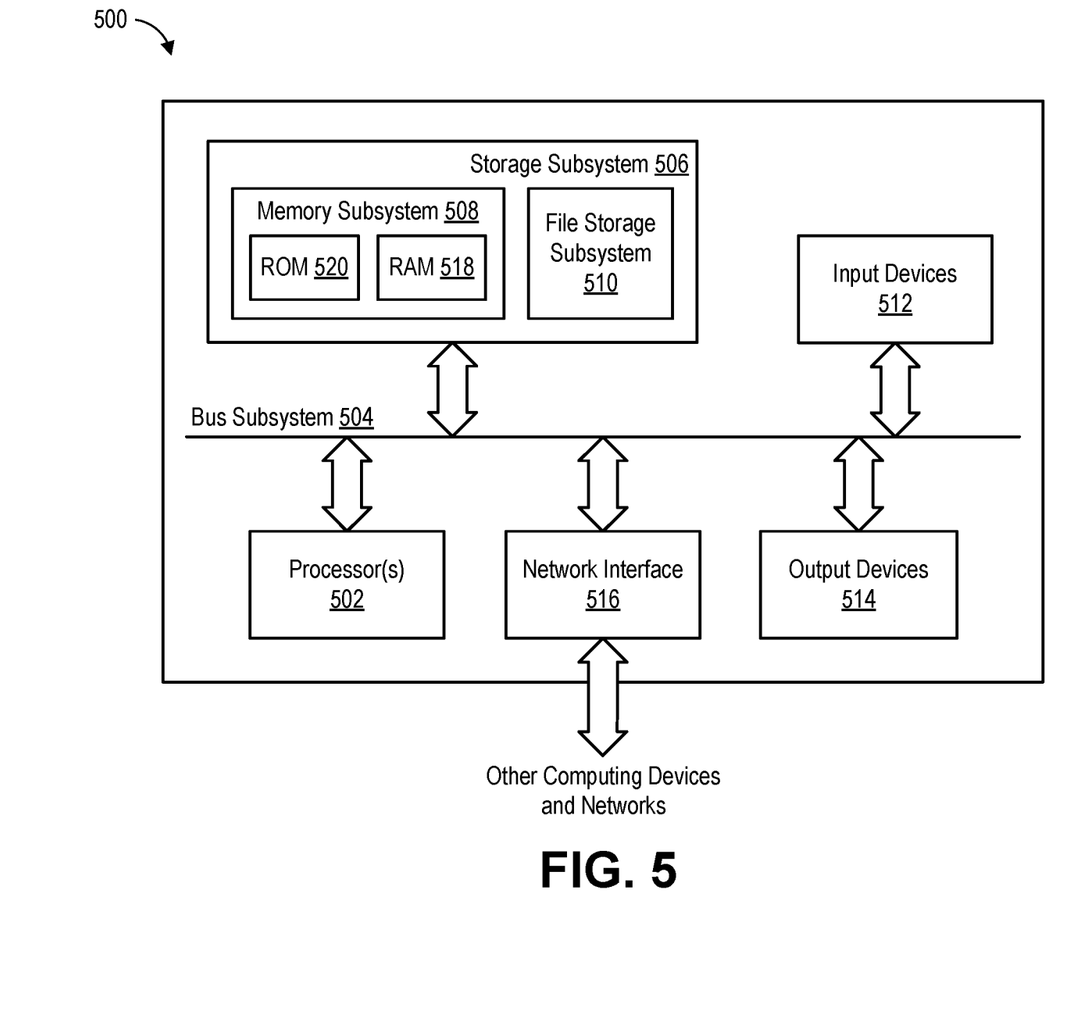
FIG. 5 illustrates a simplified block diagram of an example computer system used to encrypt, transmit, and process high volumes of compressed data according to various embodiments.

FIG. 5 depicts a simplified block diagram of an example computer system 500, which can be used to implement the techniques described in the foregoing disclosure. In some embodiments, computer system 500 may be used to implement a machine learning system as described in connection with FIG. 1 above. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses. Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that provide the functionality of embodiments of the present disclosure. Memory subsystem 508 includes a number of memories including a main random-access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. It will be appreciated that computer system 500 is illustrative and many other configurations having more or fewer components than system 500 are possible.

FURTHER EXAMPLES

Each of the following non-limiting features in the following examples may stand on its own or may be combined in various permutations or combinations with one or more of the other features in the examples below.

A computer-implemented method is disclosed for performing efficient lossless encryption and decryption to reduce power consumption and improve the efficiency of processing streams of digital data, the method comprising: receiving an input data stream associated with a stream of input data having an input data width, applying a discrete wavelet transform to a first serial input data value in the input data stream, distributing one or more distributed components of the first serial input data value by computing a cumulative probability that the first serial input data value is less than or equal to a power-of-two range value associated with a power-of-two probability distribution function, computing an entropy encoded encryption value based on a range variant asymmetrical numeral system based on the power-of-two probability distribution function, unloading the entropy encoded encryption value based on one or more computed next states, and packing one or more compressed serial output data streams based on the unloaded entropy encoded encryption value.

In some embodiments, the input data stream comprises training data to train a machine learning model.

In some embodiments, the input data width is 128 bytes.

In some embodiments, the discrete wavelet transform is a Haar transform.

In some embodiments, the cumulative probability is computed according to a range of values corresponding to the power-of-two probability distribution function.

In some embodiments, the one or more computed next states is computed based on a current state and the entropy encoded encryption value corresponding to an entropy encoded encryption value of a parallel bank in a set of parallel banks having a number of banks.

In some embodiments, the method further comprises serializing output from the set of parallel banks.

The invention claimed is:

1. A computer-implemented method for performing efficient lossless encryption and decryption to reduce power consumption and improve the efficiency of processing streams of digital data, the method comprising:
   receiving an input data stream associated with a stream of input data having an input data width;
   applying a discrete wavelet transform to a first serial input data value in the input data stream;
   distributing one or more distributed components of the first serial input data value by computing a cumulative probability that the first serial input data value is less than or equal to a power-of-two range value associated with a power-of-two probability distribution function;
   computing an entropy encoded encryption value based on a range variant asymmetrical numeral system based on the power-of-two probability distribution function;
   unloading the entropy encoded encryption value based on one or more computed next states; and
   packing one or more compressed serial output data streams based on the unloaded entropy encoded encryption value.

2. The computer-implemented method of claim 1, wherein the input data stream comprises training data to train a machine learning model.

3. The computer-implemented method of claim 1, wherein the input data width is 128 bytes.

4. The computer-implemented method of claim 1, wherein the discrete wavelet transform is a Haar transform.

5. The computer-implemented method of claim 1, wherein the cumulative probability is computed according to a range of values corresponding to the power-of-two probability distribution function.

6. The computer-implemented method of claim 1, wherein the one or more computed next states is computed based on a current state and the entropy encoded encryption value corresponding to an entropy encoded encryption value of a parallel bank in a set of parallel banks having a number of banks.

7. The computer-implemented method of claim 6, serializing output from the set of parallel banks.

8. A circuit for performing efficient lossless encryption and decryption to reduce power consumption and improve the efficiency of processing streams of digital data, the circuit comprising:
   at least one input circuit for receiving an input data stream associated with a stream of input data having an input data width;
   at least one preprocessing circuit for applying a discrete wavelet transform to a first serial input data value in the input data stream;
   at least one multiplexer circuit distributing one or more distributed components of the first serial input data value by computing a cumulative probability that the first serial input data value is less than or equal to a power-of-two range value associated with a power-of-two probability distribution function,
   wherein an entropy encoded encryption value is computed based on a range variant asymmetrical numeral system based on the power-of-two probability distribution function;
   at least one unloading circuit for unloading the entropy encoded encryption value based on one or more computed next states; and
   a parallel-to-serial converter for packing one or more compressed serial output data streams based on the unloaded entropy encoded encryption value.

9. The circuit of claim 8, wherein the input data stream comprises training data to train a machine learning model.

10. The circuit of claim 8, wherein the input data width is 128 bytes.

11. The circuit of claim 8, wherein the discrete wavelet transform is a Haar transform.

12. The circuit of claim 8, wherein the cumulative probability is computed according to a range of values corresponding to the power-of-two probability distribution function.

13. The circuit of claim 8, wherein the one or more computed next states is computed based on a current state and the entropy encoded encryption value corresponding to an entropy encoded encryption value of a parallel bank in a set of parallel banks having a number of banks.

14. The circuit of claim 13, wherein the at least one unloading circuit further comprises logic to serialize output from the set of parallel banks.

15. A non-transitory machine-readable medium storing a program executable by a computer for storing and retrieving data, the program comprising sets of instructions for:
   receiving an input data stream associated with a stream of input data having an input data width;
   applying a discrete wavelet transform to a first serial input data value in the input data stream;
   distributing one or more distributed components of the first serial input data value by computing a cumulative probability that the first serial input data value is less than or equal to a power-of-two range value associated with a power-of-two probability distribution function;

computing an entropy encoded encryption value based on a range variant asymmetrical numeral system based on the power-of-two probability distribution function;

unloading the entropy encoded encryption value based on one or more computed next states; and packing one or more compressed serial output data streams based on the unloaded entropy encoded encryption value.

16. The non-transitory machine-readable medium of claim 15, wherein the input data stream comprises training data to train a machine learning model.

17. The non-transitory machine-readable medium of claim 15, wherein the input data width is 128 bytes.

18. The non-transitory machine-readable medium of claim 15, wherein the discrete wavelet transform is a Haar transform.

19. The non-transitory machine-readable medium of claim 15, wherein the cumulative probability is computed according to a range of values corresponding to the power-of-two probability distribution function.

20. The non-transitory machine-readable medium of claim 15, wherein the one or more computed next states is computed based on a current state and the entropy encoded encryption value corresponding to an entropy encoded encryption value of a parallel bank in a set of parallel banks having a number of banks.

* * * * *